(12) United States Patent
Lau et al.

(10) Patent No.: US 9,648,053 B2
(45) Date of Patent: May 9, 2017

(54) ON-DEMAND REGISTRATION FOR INTERNET PROTOCOL MULTIMEDIA SUBSYSTEM (IMS) SERVICES

(71) Applicant: Verizon Patent and Licensing Inc., Basking Ridge, NJ (US)

(72) Inventors: Priscilla Lau, Fremont, CA (US); Ye Huang, San Ramon, CA (US); Loc Ba Vo, Pleasant Hill, CA (US); Wing-Cheong V. Yeung, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

(21) Appl. No.: 14/274,941

(22) Filed: May 12, 2014

(65) Prior Publication Data

US 2015/0326619 A1    Nov. 12, 2015

(51) Int. Cl.
*H04L 29/06* (2006.01)
*H04W 60/00* (2009.01)

(52) U.S. Cl.
CPC ...... *H04L 65/1073* (2013.01); *H04L 65/1016* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 2007/0153777 A1* | 7/2007 | Coulas | H04L 29/12188 370/356 |
| 2008/0250466 A1* | 10/2008 | Ke | H04N 7/17318 725/109 |
| 2013/0310088 A1* | 11/2013 | Wong | H04W 4/14 455/466 |
| 2015/0003342 A1* | 1/2015 | Swaminathan | H04W 76/02 370/329 |

* cited by examiner

*Primary Examiner* — Yemane Mesfin
*Assistant Examiner* — Peter Chen

(57) ABSTRACT

A device may receive service information associated with an internet protocol multimedia subsystem (IMS) service. The IMS service may be provided via an IMS network. The service information may include information that identifies a terminating device that is to receive the IMS service. The device may cause registration trigger information to be provided to the terminating device based on receiving the service information. The registration trigger information may be provided to the terminating device to cause the terminating device to register to the IMS network to allow the terminating device to receive the IMS service.

20 Claims, 12 Drawing Sheets

ON-DEMAND REGISTRATION FOR INTERNET PROTOCOL MULTIMEDIA SUBSYSTEM (IMS) SERVICES

BACKGROUND

An internet protocol multimedia subsystem (IMS) network may allow for the delivery of internet protocol (IP) multimedia services. As such, an IMS network may facilitate the use of IP for communication between users. Examples of services that may be supported by an IMS network include voice over IP (VoIP), instant messaging over IMS, short message service (SMS) over IMS, videoconferencing, and video on-demand.

DETAILED DESCRIPTION OF PREFERRED EMBODIMENTS

The following detailed description of example implementations refers to the accompanying drawings. The same reference numbers in different drawings may identify the same or similar elements.

A user device (e.g., an originating device, a terminating device) may be configured to periodically register with an IMS network to allow the user device to access IMS services (e.g., VoIP, SMS over IMS, etc.) provided via the IMS network. The user device may also be configured to periodically communicate with one or more devices included in an evolved packet core (EPC) network, associated with a long term evolution (LTE) network, to allow the user device to access the IMS network and/or receive data services (e.g., Internet browsing services, etc.) via the LTE network.

IMS registration is a procedure in which the user device requests IMS network authorization in order to access an IMS service (e.g., provided via the IMS network). For use of the IMS service, one procedure is for the user device to periodically register with the IMS network to ensure authorization to access the IMS network. However, for a particular user device (e.g., a user device that does not access the IMS service on a regular basis, a user device associated with a machine to machine application which seldom requires IMS support for voice and/or video), the need to access the IMS network may be an exception instead a norm. What is needed is on-demand IMS registration for the particular user device that requires access to the IMS network as an exception. This may enable more efficient use of the particular user device's resources and/or more may allow for more efficient use of IMS network resources. Implementations described herein may allow a user device (e.g., an originating device, a terminating device) to register to an IMS network only when the user device is initiating or receiving an IMS service via the IMS network.

While implementations described herein are described as being performed by devices associated with an LTE network, some implementations may be performed by devices associated with a network that is not an LTE network, such as a third generation ("3G") network.

Figure 1A:
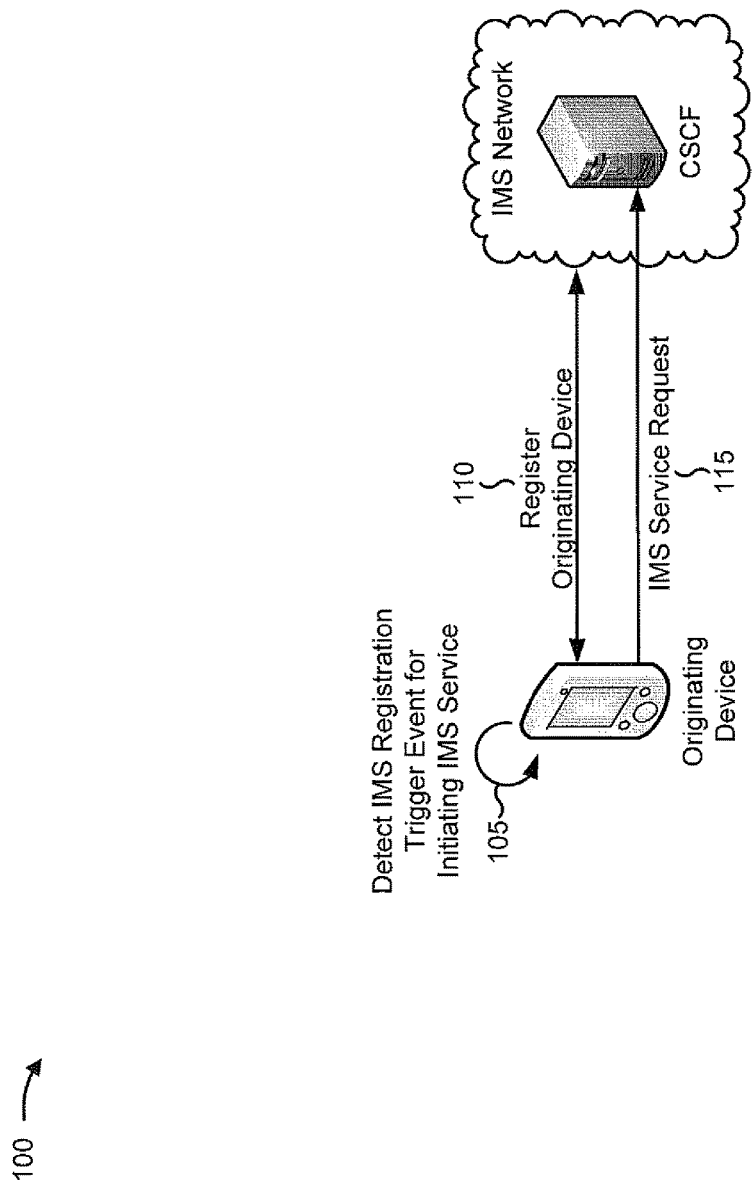
FIGS. 1A-1C are diagrams of an overview of an example implementation described herein.
Figure 1B:
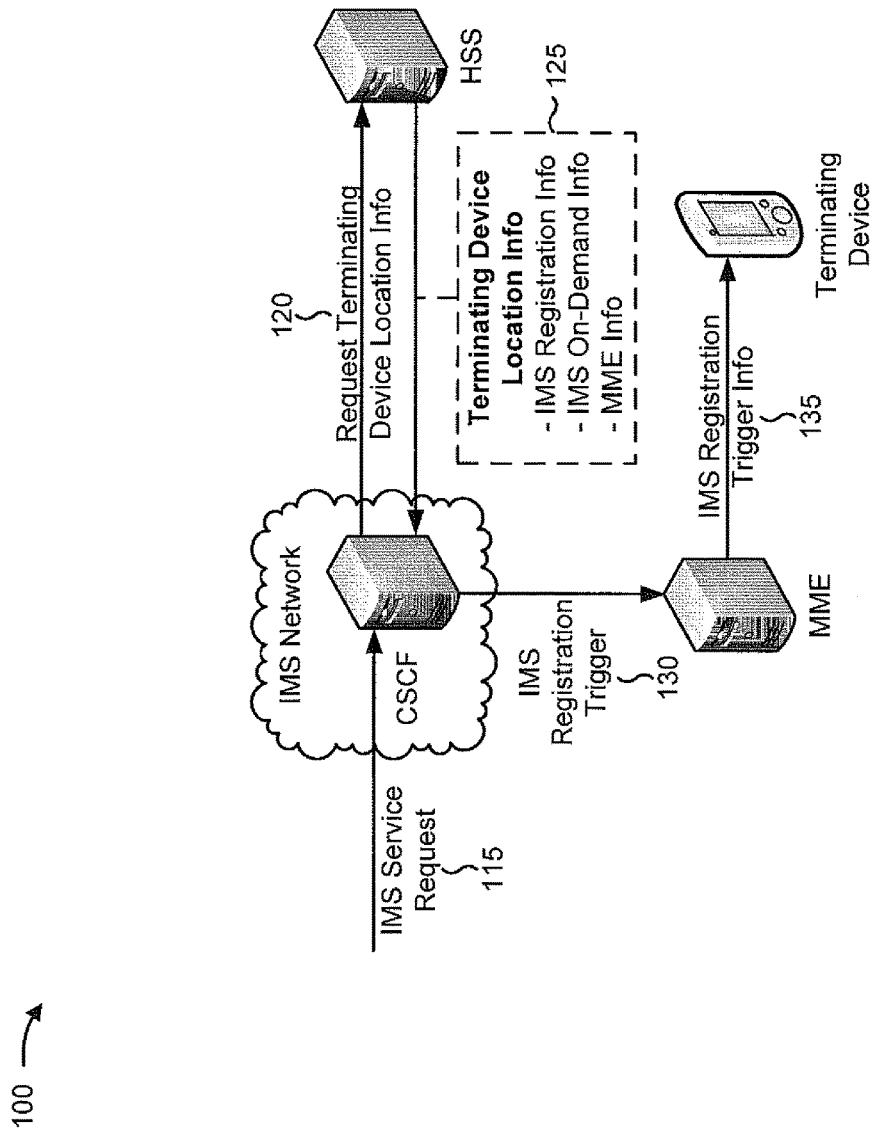
Figure 1C:
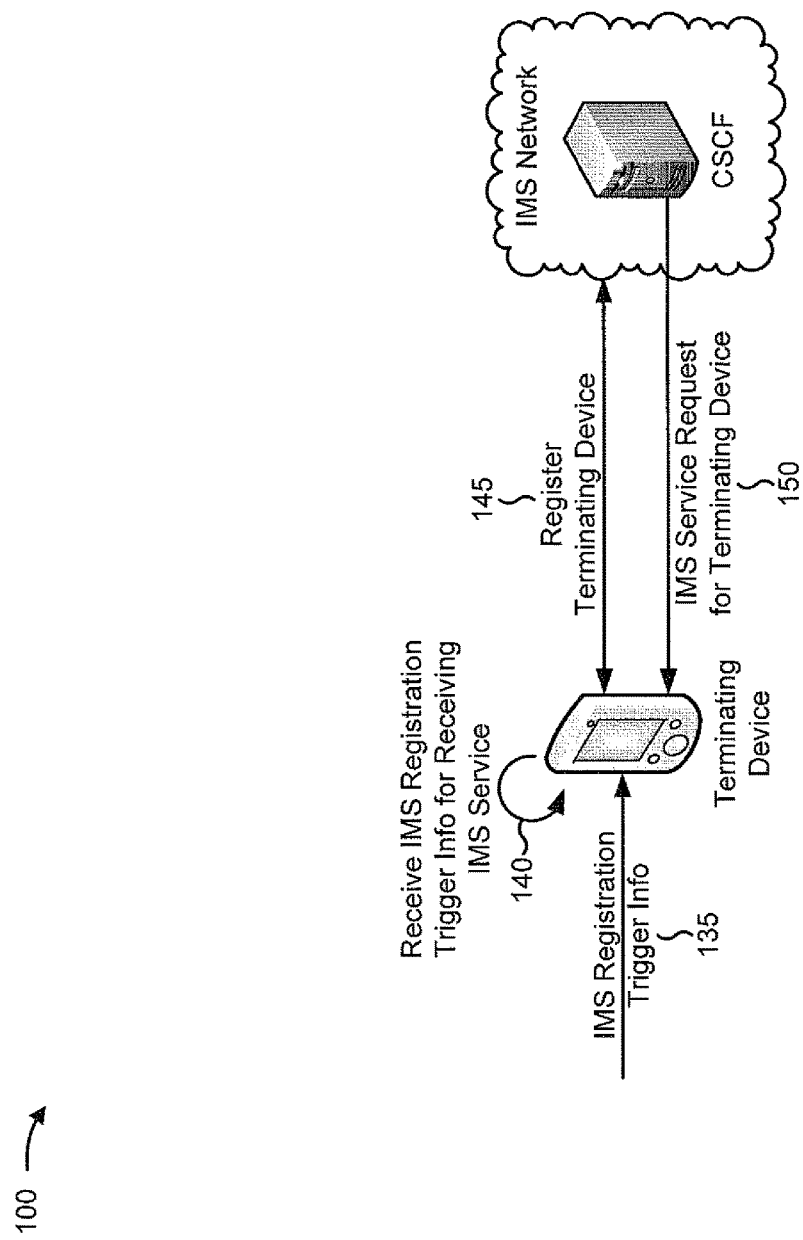

FIGS. 1A-1C are diagrams of an overview of an example implementation 100 described herein. For the purposes of example implementation 100, assume that a user, associated with a user device (e.g., an originating device), wishes to initiate an IMS service that allows the originating device to communicate with another device (e.g., a terminating device) via an IMS network. Further, assume that the originating device is not registered to the IMS network. Also, assume that the originating device is configured to detect an IMS registration trigger event when the user provides an indication associated with initiating the IMS service. Finally, assume that the user has accessed an application associated with the IMS service (e.g., via a user interface of the originating device).

As shown in FIG. 1A, and by reference number 105, the originating device may detect the IMS registration trigger event based on the user accessing the application associated with the IMS service. As shown by reference number 110, the originating device may communicate with one or more devices included in the IMS network such that the originating device registers to the IMS network. As shown by reference number 115, the originating device may provide a service request associated with the IMS service to be provided to the terminating device. As shown, the service request may be provided (e.g., via one or more other devices included in the IMS network) to a call session control function device (CSCF) (e.g., including a proxy CSCF (P-CSCF), a serving CSCF (S-CSCF), and/or an interrogating CSCF (I-CSCF)), included in the IMS network, associated with providing the IMS service to the terminating device.

As shown in FIG. 1B, the CSCF may receive the service request, and, as shown by reference number 120, may send, to a home subscriber server (HSS), a request for location information associated with the terminating device (e.g., including a request for an address of an S-CSCF assigned to the terminating device). As shown by reference number 125, the HSS may provide a response to the location information request. As shown, the response may include information indicating whether the terminating device is currently registered to the IMS network, whether the terminating device is an IMS on-demand device (e.g., whether the terminating device is capable of registering to the IMS network on-demand), and information that identifies a mobility management entity (MME), included in an EPC network to which the terminating device is currently connected. If the terminating device is currently registered with the IMS network, then the response will also include the address of the assigned S-CSCF, to which the CSCF will forward service information for the terminating device.

For the purposes of example implementation 100, assume that the location information indicates that the terminating device is not currently registered to the IMS network, that the terminating device is an IMS on-demand device, and that the terminating device is currently connected to a particular MME. As shown by reference number 130, the I-CSCF may provide, to the particular MME, IMS registration trigger information, to be forwarded to the terminating device (e.g., since the terminating device is not currently registered to the IMS network and is an IMS on-demand device) to cause the terminating device to register to the IMS network (e.g., to allow the terminating device to receive the IMS service). As shown by reference number 135, the particular MME may receive the IMS registration trigger information, and may forward the IMS registration trigger information to the terminating device.

As shown in FIG. 1C, and by reference number 140, the terminating device may receive the IMS registration trigger information, and may determine that the terminating device is to register to the IMS network. As shown by reference number 145, the terminating device may communicate with one or more devices included in the IMS network such that the terminating device registers to the IMS network. As shown by reference number 150, the terminating device may receive the service information associated with the IMS service (e.g., and the IMS service may be provided to the terminating device based on the service information). As shown, the service information may be provided (e.g., via one or more other devices included in the IMS network) by the CSCF.

In this way, a user device (e.g., an originating device, a terminating device) may be triggered to register to an IMS network only when the user device is initiating or receiving an IMS service via the IMS network (e.g., rather than automatically registering to the IMS network on a periodic basis).

Figure 2:
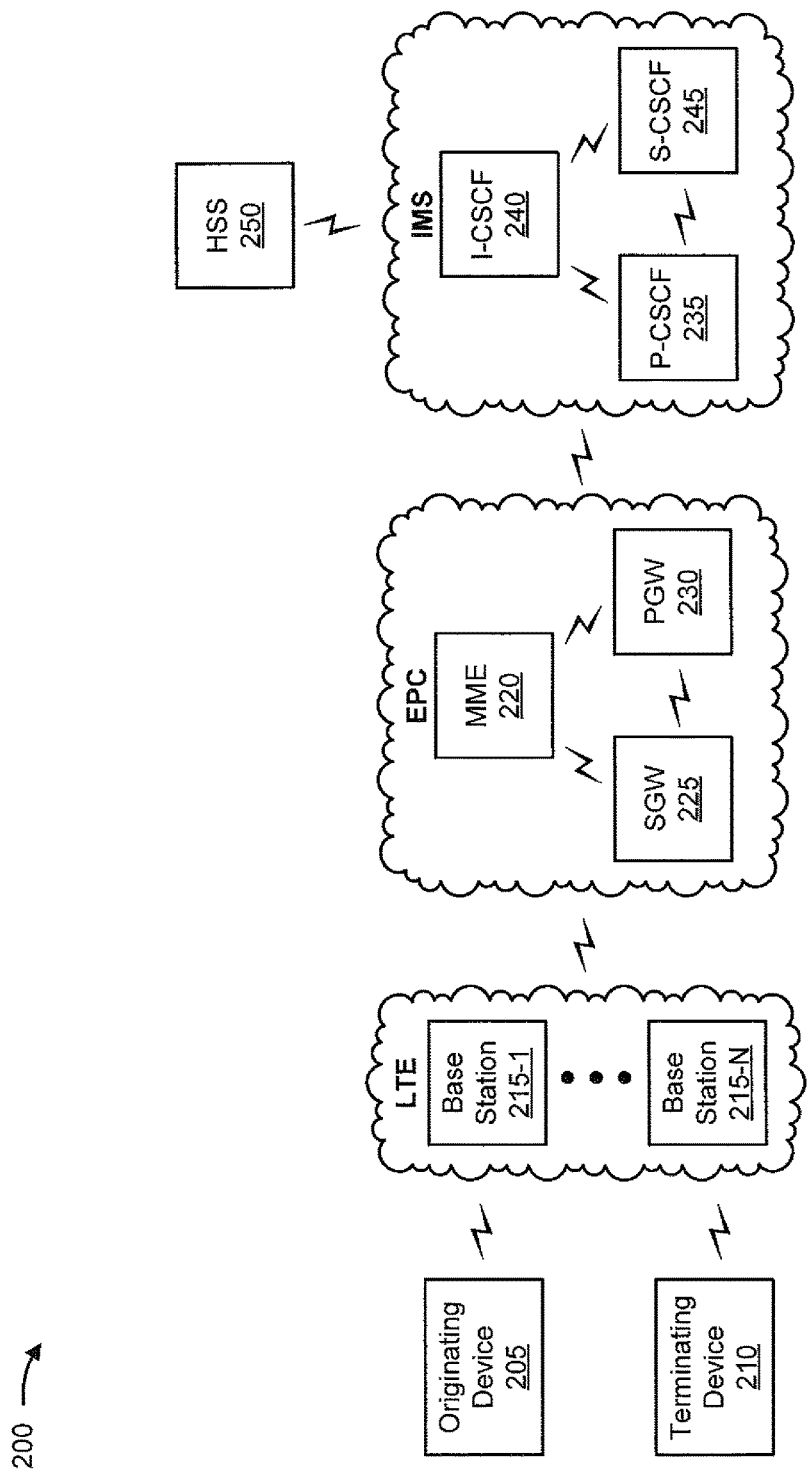
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an originating device 205, a terminating device 210, one or more base stations 215-1 through 215-N (N>1) (hereinafter collectively referred to as "base stations 215," and individually as "base station 215"), a mobility management entity (MME) 220, a serving gateway (SGW) 225, a packet data network gateway (PGW) 230, a proxy call session control function device (P-CSCF) 235, an interrogating call session control function device (I-CSCF) 240, a serving call session control function device (S-CSCF) 245, and a home subscriber server (HSS) 250.

Environment 200 may include an evolved packet system ("EPS") that includes an LTE network and/or an evolved packet core ("EPC") that operate based on a third generation partnership project ("3GPP") wireless communication standard. The LTE network may be a radio access network ("RAN") that includes one or more base stations 215 that take the form of evolved Node Bs ("eNBs") via which originating device 205 and/or terminating device 210 communicates with the EPC. The EPC may include MME 220, SGW 225, and PGW 230 that enable originating device 205 and/or terminating device 210 to communicate with an Internet protocol ("IP") multimedia subsystem ("IMS") network. The IMS network may include P-CSCF 235, I-CSCF 240, and/or S-CSCF 245, and may manage authentication, session initiation, and/or a call routing function for IMS services. HSS 250 may provide authentication information, subscriber service profile information, subscriber quality of service rules, registration status information, serving node information, etc., associated with IMS services provided to from originating device 205 and/or terminating device 210. In some implementations, HSS 250 may reside in the EPC and/or the IMS network.

Originating device 205 may include a device that is capable of communicating with terminating device 210 and/or one or more other devices included in environment 200. For example, originating device 205 may include a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a personal gaming system, and/or a similar device. In some implementations, originating device 205 may be capable of receiving and/or providing information associated with an IMS service. Additionally, or alternatively, originating device 205 may be capable of detecting a registration trigger event, associated with an IMS service, and registering to the IMS network based on detecting the registration trigger event.

Terminating device 210 may include a device that is capable of communicating with originating device 205 and/or one or more other devices included in environment 200. For example, terminating device 210 may include a wireless communication device, a radiotelephone, a PCS terminal, a PDA, a smart phone, a laptop computer, a tablet computer, a personal gaming system, and/or a similar device. In some implementations, terminating device 210 may be capable of receiving and/or providing information associated with an IMS service. Additionally, or alternatively, terminating device 210 may be capable of receiving registration trigger information, associated with an IMS service, and registering to the IMS network based on receiving the registration trigger information.

Base station 215 may include a device capable of transferring traffic, such as IMS traffic, audio traffic, video traffic, text traffic, and/or other traffic, destined for and/or received from originating device 205 and/or terminating device 210. In some implementations, base station 215 may be include an eNB associated with the LTE network that receives traffic from and/or sends traffic to the IMS network via MME 220, SGW 225, and/or PGW 230. In some implementations, base station 215 may send traffic to and/or receive traffic from originating device 205 and/or terminating device 210 via an air interface. In some implementations, base station 215 may be associated with a small cell, such as a microcell, a picocell, and/or a femtocell.

MME 220 may include a device capable of managing authentication, activation, deactivation, and mobility functions associated with originating device 205 and/or terminating device 210. For example, MME 220 may include a server. In some implementations, MME 220 may perform operations relating to authentication of originating device 205 and/or terminating device 210. Additionally, or alternatively, MME 220 may facilitate the selection of a SGW 225 and/or PGW 230 to serve traffic to and/or from originating device 205 and/or terminating device 210. MME 220 may perform an operation associated with handing off originating device 205 and/or terminating device 210 from a first base station 215 to a second base station 215 when originating device 205 and/or terminating device 210 is transitioning from a cell associated with the first base station 215 to a cell associated with the second base station 215. Additionally, or alternatively, MME 220 may select another MME (not pictured), to which originating device 205 and/or terminating device 210 should be handed off (e.g., when originating device 205 and/or terminating device 210 moves out of range of MME 220).

SGW 225 may include a device capable of routing traffic. For example, SGW 225 may include one or more data processing and/or traffic transfer devices, such as a gateway, a router, a modem, a switch, a firewall, a network interface card ("NIC"), a hub, a bridge, a server, an optical add/drop multiplexer ("OADM"), or any other type of device that processes and/or transfers traffic. In some implementations, SGW 225 may aggregate traffic received from one or more base stations 215 associated with the LTE network, and may send the aggregated traffic to PGW 230 and/or other network devices associated with the IMS core and/or the EPC. In some implementations, SGW 225 may perform operations associated with handing off originating device 205 and/or terminating device 210 to and/or from the LTE network.

PGW 230 may include a device capable of providing connectivity for originating device 205 and/or terminating device 210 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 230 may aggregate traffic received from one or more SGWs 225, and may send the aggregated traffic to another device and/or network.

P-CSCF 235, I-CSCF 240, and S-SCSCF 245 may include one or more devices, such as one or more server devices included in an IMS network, capable of managing signal and control functions in the IMS network. In some implementations, P-CSCF 235, I-CSCF 240, and/or S-SCSCF 245 may process and/or route service information, associated with an IMS service, to and from originating device 205 and/or terminating device 210. For example, P-CSCF 235, I-CSCF 240, and/or S-SCSCF 245 may process service information, associated with an IMS service and received from originating device 205, that is destined for terminating device 210. In some implementations, P-CSCF 235, I-CSCF 240, and/or S-SCSCF 245 may be capable of receiving, determining, storing, generating, and/or providing information that causes originating device 205 and/or terminating device 210 to register to the IMS network. In some implementations, P-CSCF 235, I-CSCF 240, and/or S-SCSCF 245 may include a registration trigger function that is capable of causing a registration trigger information, associated with an IMS service, to be provided to terminating device 210 (e.g., to cause terminating device 210 to register to the IMS network). In some implementations, P-CSCF 235, I-CSCF 240, and/or S-SCSCF 245 may communicate with HSS 250 to determine information (e.g., authentication information, location information, etc.) associated with originating device 205 and/or terminating device 210.

HSS 250 may include one or more devices, such as one or more server devices, capable of managing subscription and/or other information associated with originating device 205 and/or terminating device 210. For example, HSS 250 may receive, store, and/or provide profile information associated with originating device 205 and/or terminating device 210 that identifies IMS applications and/or IMS services that are permitted for use by and/or accessible by originating device 205 and/or terminating device 210, information associated with users of originating device 205 and/or terminating device 210 (e.g., a username, a password, a personal identification number ("PIN"), etc.), subscription information, rate information, minutes allowed, bandwidth allocation policy information, and/or other information. In some implementations, HSS 250 may store location information, associated with originating device 205 and/or terminating device 210, that identifies MME 220 to which originating device 205 and/or terminating device 210 is connected.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
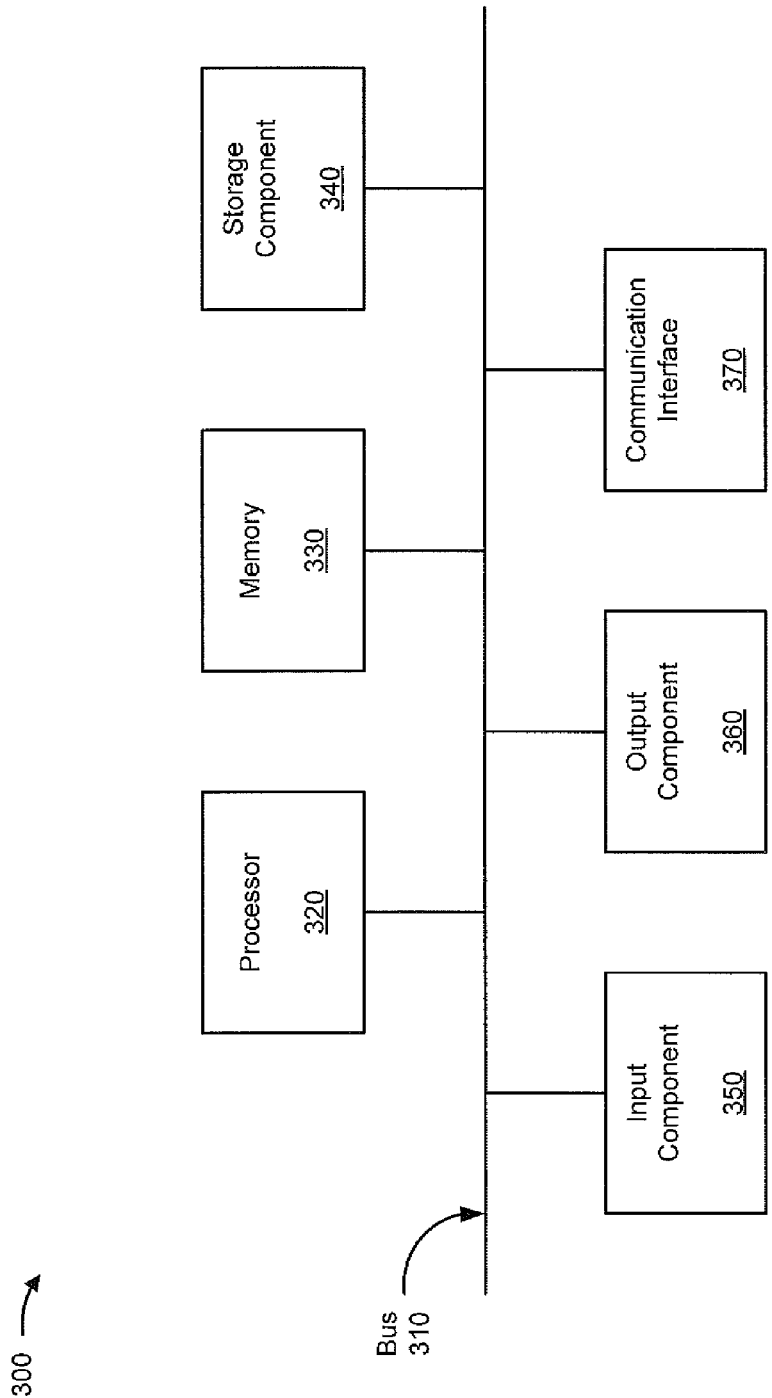
FIG. 3 is a diagram of example components of one or more devices of FIG. 2.

FIG. 3 is a diagram of example components of a device 300. Device 300 may correspond to originating device 205, terminating device 210, base station 215, MME 220, SGW 225, PGW 230, P-CSCF 235, I-CSCF 240, S-CSCF 245, and/or HSS 250. In some implementations, originating device 205, terminating device 210, base station 215, MME 220, SGW 225, PGW 230, P-CSCF 235, I-CSCF 240, S-CSCF 245, and/or HSS 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
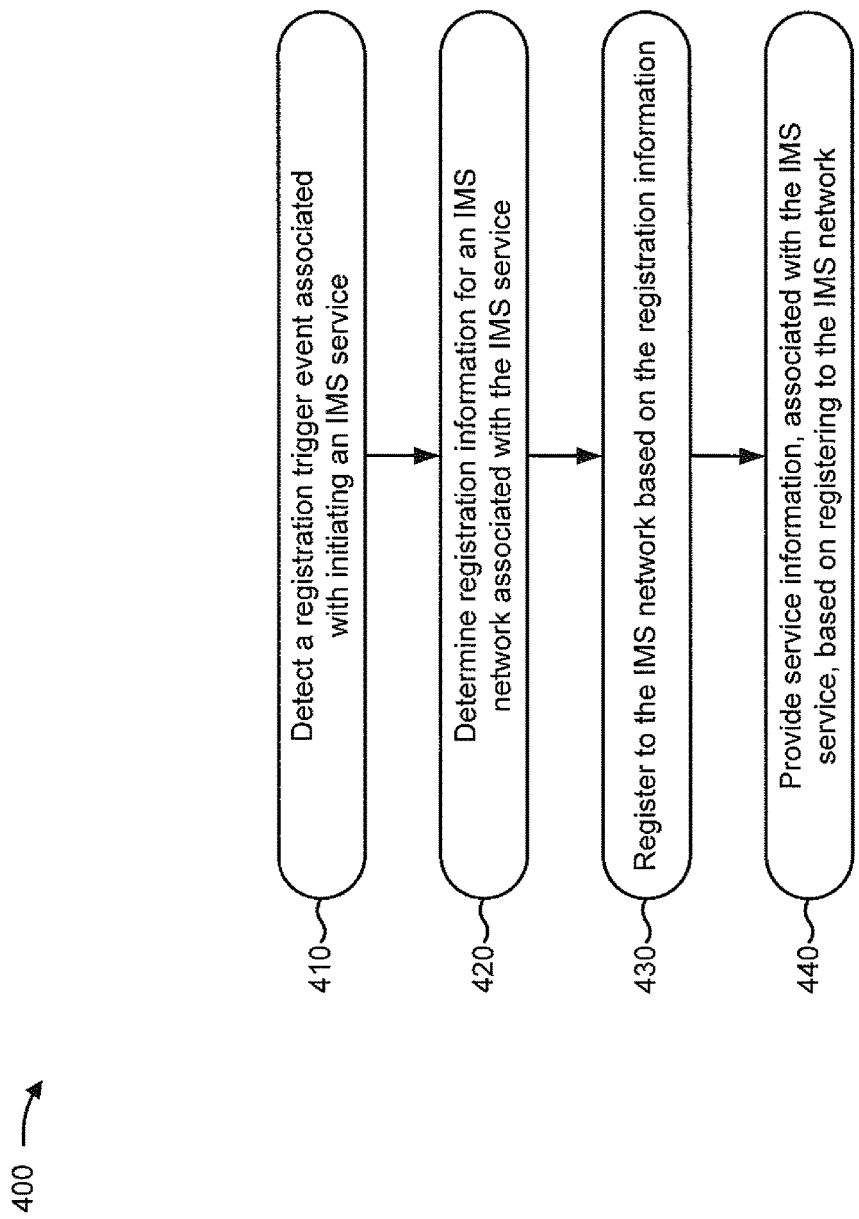
FIG. 4 is a flow chart of an example process for detecting a registration trigger event, associated with initiating an IMS service, and registering to an IMS network.

FIG. 4 is a flow chart of an example process 400 for detecting a registration trigger event, associated with initiating an IMS service, and registering to an IMS network. In some implementations, one or more process blocks of FIG. 4 may be performed by originating device 205.

As shown in FIG. 4, process 400 may include detecting a registration trigger event associated with initiating an IMS service (block 410). For example, originating device 205 may detect a registration trigger event associated with initiating and IMS service. In some implementations, originating device 205 may detect the registration trigger event when a user, associated with originating device 205, provides input associated with initiating an IMS service.

A registration trigger event, associated with an IMS service, may include an event that, when detected by originating device 205, causes originating device 210 to register to an IMS network associated with the IMS service. In some implementations, the registration trigger event may include an event associated with initiating an IMS service. For example, the registration trigger event may be associated with a user making a voice call via the IMS network (e.g., when the user opens a VoIP application, when the user opens a phone book application associated with originating device 205, when the user opens a dialing pad associated with originating device 205, etc.), sending a message via the IMS network (e.g., when the user opens a SMS over IMS messaging application, when the user opens an instant messaging application, etc.), or activity associated with another type of service that utilizes the IMS network. In some implementations, the registration trigger event may be associated with terminating device 210 (e.g., when the user of originating device 205 wishes to place a VoIP call to terminating device 210, when the user of originating device 205 wishes to send an SMS message via the IMS network to terminating device 210, etc.).

In some implementations, originating device 205 may detect the registration trigger event based on information stored by originating device 205. For example, originating device 205 may store information that identifies applications associated with one or more IMS services. In this example, the user may provide (e.g., via a user interface of originating device 205) an indication that originating device 205 is to open a particular application. Originating device 205 may then determine (e.g., based on the stored information) whether the particular application is an application associated with the one or more IMS services. Here, originating device 205 may detect a registration trigger event if the particular application is associated with the one or more IMS services. Additionally, or alternatively, originating device 205 may detect the registration trigger event based on user input (e.g., when the user indicates that a particular application is associated with an IMS service).

As further shown in FIG. 4, process 400 may include determining registration information for an IMS network associated with the IMS service (block 420). For example, originating device 205 may determine registration information for an IMS network associated with the IMS service. In some implementations, originating device 205 may determine the registration information for the IMS network after originating device 205 detects the registration trigger event.

Registration information, associated with an IMS network, may include information that permits a device (e.g., originating device 205, terminating device 210) to register to the IMS network in order to initiate and/or receive an IMS service via the IMS network. For example, the registration information may include a network address (e.g., an IP address) that identifies P-CSCF 235 through which originating device 205 is to register to the IMS network.

In some implementations, originating device 205 may determine the registration information based on information stored by originating device 205. For example, originating device 205 may periodically (e.g., every 50 minutes, every 90 minutes, etc.) connect to one or more devices (e.g., MME 220) included in an EPC network associated with originating device 205 (e.g., to allow originating device 205 to receive data services via the EPC network and the LTE network). In this example, each time originating device 205 connects to the EPC network, originating device 205 may receive (e.g., from MME 220) an IP address that identifies P-CSCF 235 through which originating device 205 may register to the IMS network. Originating device 205 may store the IP address, and may determine the IP address based on storing the IP address.

As further shown in FIG. 4, process 400 may include registering to the IMS network based on the registration information (block 430). For example, originating device 205 may register to the IMS network based on the registration information. In some implementations, originating device 205 may register to the IMS network after originating device 205 determines the registration information.

In some implementations, originating device 205 may register to the IMS network based on the registration information. For example, originating device 205 may determine registration information that includes an IP address that identifies P-CSCF 235. Originating device 205 may provide a registration request to P-CSCF 235. P-CSCF 235 may identify (e.g., by performing a domain name system (DNS) lookup) I-CSCF 240 that is to serve originating device 205, and may provide the registration request to I-CSCF 240. I-CSCF 240 may communicate with HSS 250 to determine S-CSCF 245 that is to serve originating device 205 (e.g., by identifying an assigned S-CSCF 245, by selecting a S-CSCF 245, etc.), and may forward the registration request to S-CSCF 245. S-CSCF 245 may communicate with HSS 250 to determine authentication information associated with originating device 205, and may then communicate with originating device 205 to register originating device 205 to the IMS network. In this way, originating device 205 may register to the IMS network and may communicate via I-CSCF 240 and/or S-CSCF 245 to initiate and/or receive an IMS service. In some implementations, originating device 205 may register to the IMS network in another manner.

As further shown in FIG. 4, process 400 may include providing service information, associated with the IMS service, based on registering to the IMS network (block 440). For example, originating device 205 may provide service information, associated with the IMS service, based on registering to the IMS network. In some implementations, originating device 205 may provide the service information to I-CSCF 240 (e.g., via S-CSCF 245) after originating device 205 registers to the IMS network. Additionally, or alternatively, originating device 205 may provide the service information when originating device 205 receives information, indicating that originating device 205 is to provide the service information, from another device.

Service information, associated with an IMS service, may include information associated with initiating and/or receiving the IMS service via an IMS network. For example, the service information may include information that identifies the IMS service (e.g., a name of the IMS service, a type of the IMS service, etc.), a request associated with the IMS service (e.g., a request to initiate a voice call, a request to provide a text message, etc.), information that identifies originating device 205 (e.g., a mobile directory number (MDN), a mobile station international subscriber directory number (MSISDN), and IP address, etc.), information that identifies a user of originating device 205 (e.g., a username, a name, a user account number, a user identification number, etc.), information that identifies terminating device 210 (e.g., an MDN, an MSISDN, an IP address, etc.), information that identifies a user of terminating device 210 (e.g., a username, a name, a user account number, a user identification number, etc.), information that identifies I-CSCF 240 and/or S-CSCF 245 that is to serve originating device 205, or another type of information associated with the IMS service. In some implementations, originating device 205 may provide the service information to I-CSCF 240 and/or S-CSCF 245.

In some implementations, originating device 205 may provide the service information to initiate provisioning of the IMS service. For example, originating device 205 may provide service information, associated with a VoIP call to terminating device 210, that may be received, processed, forwarded, etc. by one or more devices included in the IMS network (e.g., P-CSCF 235, I-CSCF 240, S-CSCF 245, etc.) to establish a VoIP call between originating device 205 and terminating device 210.

In some implementations, originating device 205 may deregister from the IMS network after the IMS service has ended. For example, originating device 205 may register to the IMS network to place a VoIP call to terminating device 210. In this example, originating device 205 may deregister from the IMS network after the VoIP call ends (e.g., when the VoIP call is disconnected). Additionally, or alternatively, originating device 205 may deregister from the IMS network after a threshold amount of time. For example, originating device 205 may register to the IMS network to place a VoIP call to terminating device 210. In this example, assume that originating device 205 is configured to remain registered to the IMS network for a threshold amount of time (e.g., 2 hours, 4 hours, etc.) after registering. As such, originating device 205 may deregister from the IMS network when the threshold amount of time is satisfied (e.g., originating device 205 may deregister from the IMS network after 2 hours even if the VoIP call is terminated after 30 minutes). Additionally, or alternatively, originating device 205 may deregister based on a command provided by another device, such as P-CSCF 235, I-CSCF 240, or S-CSCF 245 (e.g., when the other device determines that the IMS service has ended).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
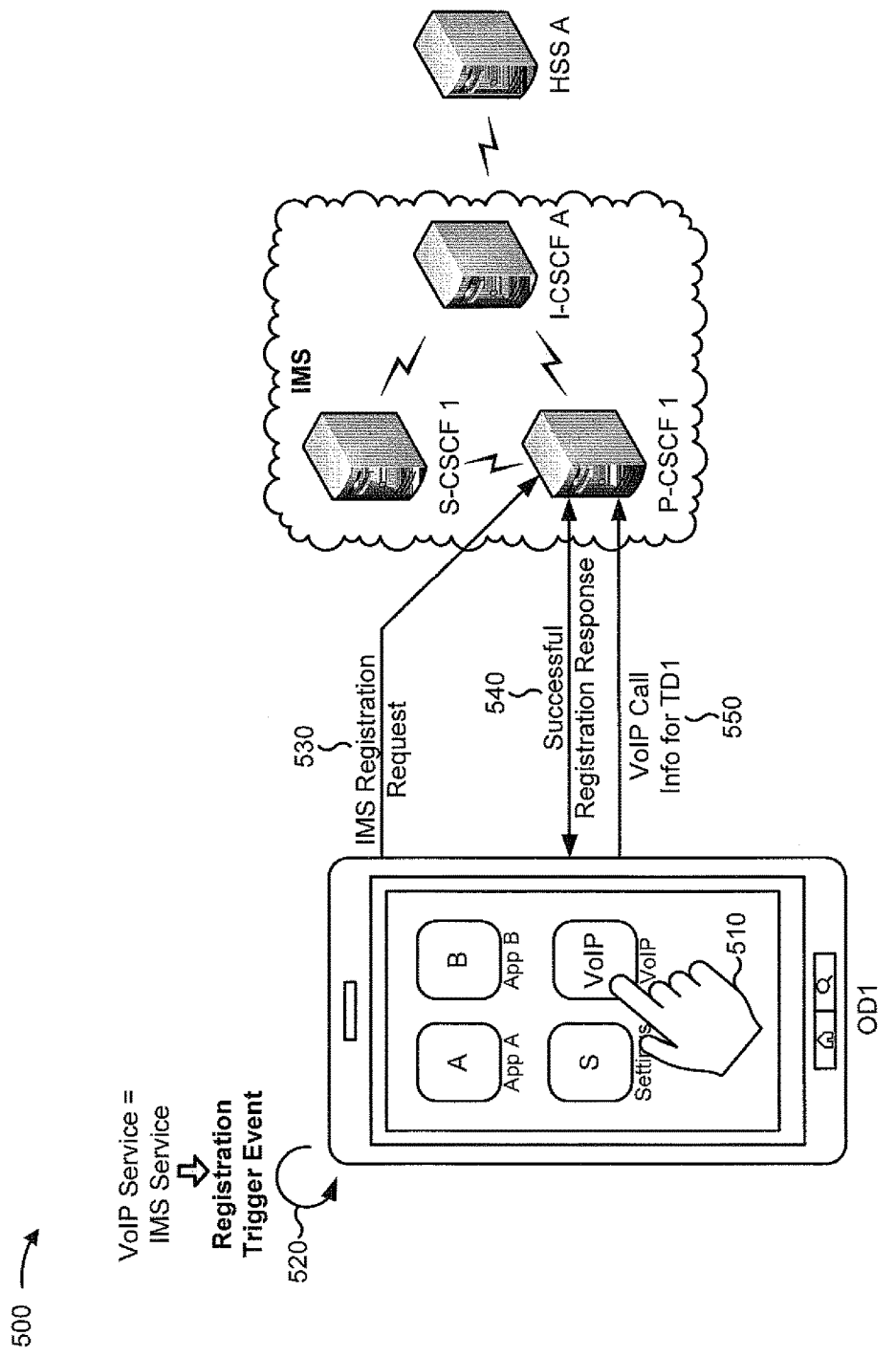
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that a user of an originating device, OD1, wishes to place a VoIP call to a terminating device, TD1, using a VoIP service. Further, assume that OD1 is not registered to an IMS network through which voice calls associated with the VoIP service are to be provided, and that OD1 is configured to register to the IMS network based on detecting a registration trigger event associated with an IMS service such as the VoIP service. Finally, assume that OD1 is connected to an EPC network via an LTE network, and that OD1 stores information that identifies a P-CSCF (e.g., P-CSCF 1) through which OD1 is to register to the IMS network.

As shown in FIG. 5, and by reference number 510, the user may indicate (e.g., by selecting a VoIP service button displayed via a user interface of OD1) that the user wishes OD1 to place a voice call using the VoIP service. As shown by reference number 520, OD1 may identify (e.g., based on information stored by OD1) that the VoIP service is an IMS service, and, as such, may detect a registration trigger event indicating that OD1 is to register to the IMS network (e.g., since the VoIP service is an IMS service).

As shown by reference number 530, OD1 may send, to P-CSCF 1, a registration request associated with registering to the IMS network. As shown by reference number 540, OD1 may register with the IMS network and P-CSCF 1 may provide a registration response indicating that OD1 has successfully registered with the IMS network. For example, P-CSCF 1 may select an I-CSCF A to serve OD1 based information provided in the registration request, and may provide the registration request to I-CSCF A. I-CSCF A may communicate with HSS A, associated with the IMS network, to determine that S-CSCF 1 is to serve OD1, and may forward the registration request to S-CSCF 1. S-CSCF 1 may communicate with HSS A to determine authentication information associated with OD1, and may then communicate with OD1 for authentication and to determine whether OD1 is successfully registered with the IMS network. In this way, OD1 may register to the IMS network and may communicate via S-CSCF 1 to initiate the VoIP call to TD1. Assume that the user indicates (e.g., via a user interface associated with the VoIP service) that the user wishes to place a VoIP call to TD1. As shown by reference number 550, OD1 may provide, to S-CSCF 1 via P-CSCF, service information (e.g., VoIP call information) associated with the VoIP call to TD1.

As indicated above, FIG. 5 is provided merely as an example. Other examples are possible and may differ from what was described with regard to FIG. 5.

Figure 6:
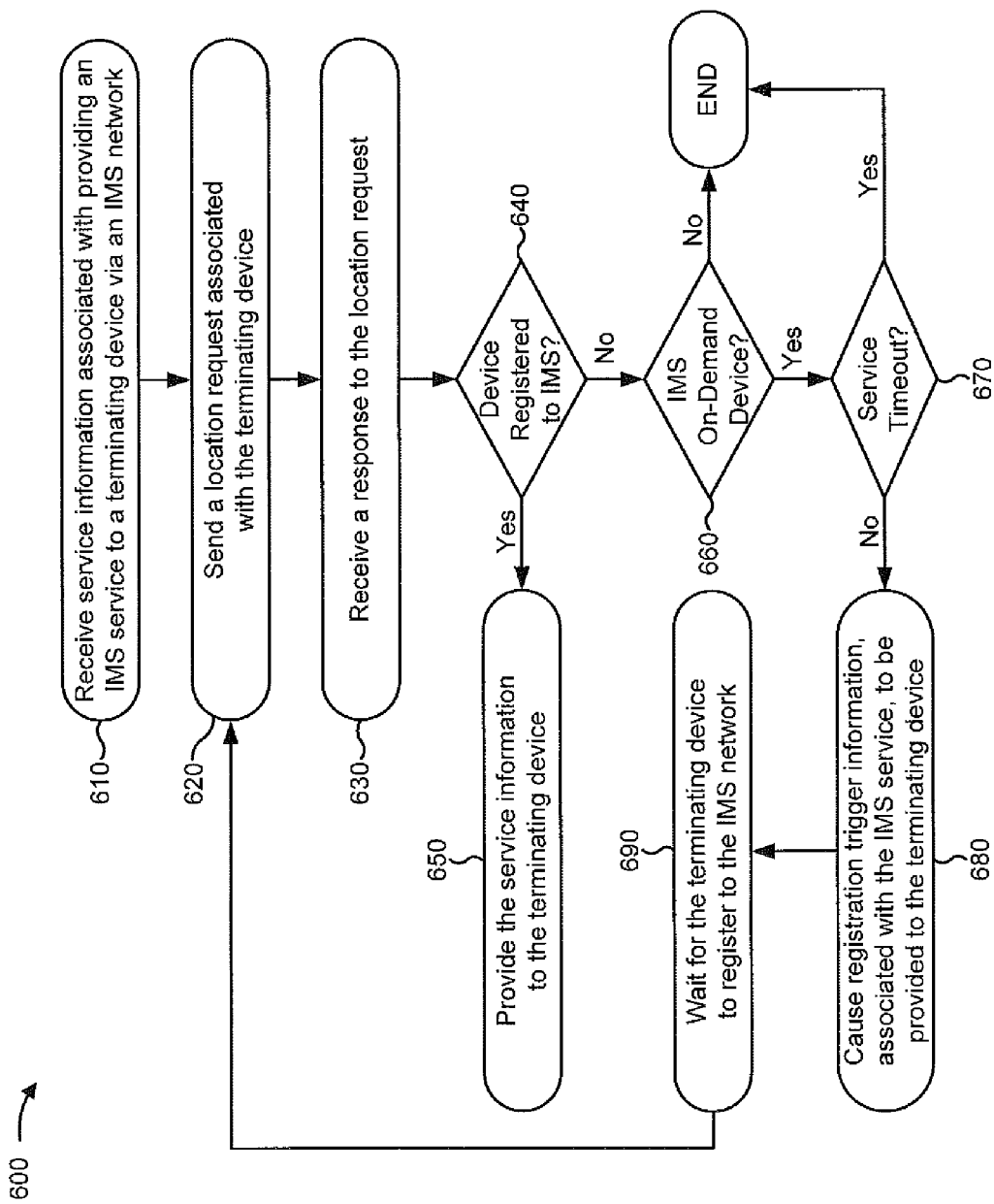
FIG. 6 is a flow chart of an example process for receiving service information, associated with providing an IMS service to a terminating device, and causing registration trigger information to be provided to the terminating device to cause the terminating device to register to an IMS network associated with providing the IMS service.

FIG. 6 is a flow chart of an example process 600 for receiving service information, associated with providing an IMS service to a terminating device, and causing registration trigger information to be provided to the terminating device to cause the terminating device to register to an IMS network associated with providing the IMS service. In some implementations, one or more process blocks of FIG. 6 may be performed by I-CSCF 240. In some implementations, one or more process blocks of FIG. 6 may be performed by another device or a group of devices separate from or including I-CSCF 240, such as another device included in environment 200.

As shown in FIG. 6, process 600 may include receiving service information associated with providing an IMS service to a terminating device via an IMS network (block 610). For example, I-CSCF 240 may receive service information associated with providing an IMS service to terminating device 210 via an IMS network. In some implementations, I-CSCF 240 may receive the service information after originating device 205 provides the service information. Additionally, or alternatively, I-CSCF 240 may receive the service information after the service information is provided by another device, such as an IMS application server (e.g., a rich communication service (RCS) server or a short message service center (SMSC), etc.) included in the IMS network.

Service information, associated with an IMS service, may include information associated with initiating and/or receiving an IMS service (e.g., including information that identifies terminating device 210 associated with the IMS service), as described above. In some implementations, I-CSCF 240 may receive the service information based on I-CSCF 240 being assigned to serve terminating device 210. For example, originating P-CSCF 235, serving originating device 205, may identify originating S-CSCF 245 that is to serve originating device 205, based on registration procedure performed by originating device 205, as described above. The originating S-CSCF 245, using some kind of routing mechanism or function (e.g., routing table, rules or algorithms, etc.,) that may be local to the originating S-CSCF 245 or provided by an external function or element (e.g., Telephone Application Server, ENUM server, database, etc.), may identify I-CSCF 240 serving the terminating device 210. In this example, originating device 205 may provide the service information to originating S-CSCF 245 (e.g., assigned to serve originating device 205) via originating P-CSCF 235, and originating S-CSCF 245 may forward the service information to I-CSCF 240 that is to serve terminating device 205, as described above.

In some implementations, I-CSCF 240 may start an IMS service timer when I-CSCF 240 receives the service information. The IMS service timer may be used by I-CSCF 240 to determine whether I-CSCF 240 is to continue attempting to cause terminating device 210 to register to the IMS network, as discussed below with regard to block 670.

As further shown in FIG. 6, process 600 may include sending a location request associated with the terminating device (block 620). For example, I-CSCF 240 may send a location request associated with terminating device 210 identified in the service information. In some implementations, I-CSCF 240 may send the location request after I-CSCF 240 receives the service information. Additionally, or alternatively, I-CSCF 240 may send the location request when I-CSCF 240 receives information, indicating that I-CSCF 240 is to send the location request, from another device A location request may include a request for information associated with provisioning an IMS service to terminating device 210. For example, the location request may include information that identifies terminating device 210 (e.g., a uniform resource identifier (URI), an international mobile subscriber identity (IMSI), an MSISDN, etc.), a request for IMS registration status information associated with terminating device 210 (e.g., whether terminating device 210 is registered to the IMS network, whether terminating device 210 is assigned to a particular S-CSCF 240, etc.), a request for determining whether terminating device 210 is an IMS on-demand device (e.g., whether terminating device 210 is capable of registering to the IMS network based on receiving registration trigger information), a request for EPC network connection information associated with terminating device 210 (e.g., an MME 220 to which terminating device 210 is connected), and/or other information associated with provisioning the IMS service to terminating device 210. In some implementations, I-CSCF 240 may provide the location request to HSS 250. Additionally, or alternatively, I-CSCF 240 may provide the location request to another device.

As further shown in FIG. 6, process 600 may include receiving a response to the location request (block 630). For example, I-CSCF 240 may receive a response to the location request. In some implementations, I-CSCF 240 may receive the response after I-CSCF 240 provides the location request. Additionally, or alternatively, I-CSCF 240 may receive the response after another device provides the response, such as HSS 250.

In some implementations, the response may include information based on one or more requests included in the location request. For example, the response may include information indicating whether terminating device 210 is registered to the IMS network, information indicating whether terminating device 210 is an IMS on-demand device, EPC network connection information associated with terminating device 210, and/or other information associated with provisioning the IMS service to terminating device 210.

As further shown in FIG. 6, process 600 may include determining whether the terminating device is registered to the IMS network (block 640). For example, I-CSCF 240 may determine whether the terminating device 210 is registered to the IMS network. In some implementations, I-CSCF 240 may determine whether terminating device 210 is registered to the IMS network after I-CSCF 240 receives the response to the location request.

In some implementations, I-CSCF 240 may determine whether terminating device 210 is registered to the IMS network based on the response to the location request. For example, the response may include information indicating whether terminating device 210 is registered to the IMS network, as discussed above with regard to block 630.

As further shown in FIG. 6, if the terminating device is registered to the IMS network (block 640—YES), then process 600 may include providing the service information to the terminating device (block 650). For example, I-CSCF 240 may determine that terminating device 210 is registered to the IMS network, and I-CSCF 240 may provide the service information to terminating device 210.

In some implementations, I-CSCF 240 may determine that terminating device 210 is registered to the IMS network, and I-CSCF 240 may identify (e.g., based on the response to the location request) a particular S-CSCF 245 to which terminating device 210 is assigned. In this example, I-CSCF 240 may provide the service information to the particular S-CSCF 245. The particular S-CSCF 245 may then forward the service information to terminating device 210 (e.g., such that the IMS service may be provided to terminating device 210) via terminating P-CSCF 235.

As further shown in FIG. 6, if the terminating device is not registered to the IMS network (block 640—NO), then process 600 may include determining whether the terminating device is an IMS on-demand device (block 660). For example, I-CSCF 240 may determine that terminating device 210 is not registered to the IMS network, and I-CSCF 240 may determine whether terminating device 210 is an IMS on-demand device.

An IMS on-demand device may include a device that is configured to receive registration trigger information, and register to an IMS network based on receiving the registration trigger information. In some implementations, I-CSCF 240 may determine whether terminating device 210 is an IMS on-demand device based on the response to the location request. For example, the response may include information indicating whether terminating device 210 is an IMS on-demand device (e.g., when HSS 250 stores information indicating whether terminating device 210 is an IMS on-demand device, and includes the information in the response to the location request).

As further shown in FIG. 6, if the terminating device is not an IMS on-demand device (block 660—NO), then process 600 may include ceasing attempts to cause terminating device 210 to register to the IMS network. For example, I-CSCF 240 may determine that terminating device 210 is not an IMS on-demand device (e.g., when terminating device 210 does not support IMS on-demand registration, when an IMS on-demand feature of terminating device 210 is disabled, etc.), and may cease attempts to cause terminating device 210 to register to the IMS network.

In some implementations, I-CSCF 240 may cease attempting to cause terminating device 210 to register to the IMS network, and may process the service information in another manner. For example, if the IMS service to be provided to terminating device 210 is a VoIP call service (e.g., that allows a calling party to call terminating device 210 using a VoIP service), then I-CSCF 240 may cease attempts to cause terminating device 210 to register to the IMS network, and may process the service information, associated with the VoIP call service, by routing the VoIP call to a voice mail box associated with terminating device 210, by forwarding the VoIP call to another device, etc. Alternatively, I-CSCF 240 may send back an error code to service requestor (e.g., the originating device 205, RCS server, or SMSC, etc) indicating terminating device 210 is temporarily unreachable.

As further shown in FIG. 6, if the terminating device is an IMS on-demand device (block 660—YES), then process 600 may include determining whether an IMS service timer, associated with providing the service information, has expired (block 670). For example, I-CSCF 240 may determine that terminating device 210 is an IMS on-demand device, and I-CSCF 240 may determine whether the IMS service timer, started by I-CSCF 240, has expired.

As described above, an IMS service timer may include a timer used by I-CSCF 240 to determine whether I-CSCF 240 is to continue attempting to cause terminating device 210 to register to the IMS network. For example, I-CSCF 240 may start the IMS service timer when I-CSCF 240 receives the service information, and may proceed as described with regard to blocks 620 through 660. I-CSCF 240 may then determine whether the IMS service timer has expired (e.g., whether the IMS service timer has satisfied a threshold amount of time, such as 3 seconds, 5 seconds, etc.) when process 600 reaches block 670. In some implementations, I-CSCF 240 may attempt to cause terminating device 210 to register to the IMS network multiple times before the IMS service timer expires, as described below.

As further shown in FIG. 6, if the IMS service timer has expired (block 670—YES), then process 600 may include ceasing attempts to cause terminating device 210 to register to the IMS network, as described above.

As further shown in FIG. 6, if the IMS service timer has not expired (block 670—NO), then process 600 may include causing registration trigger information, associated with the IMS service, to be provide to the terminating device (block 680). For example, I-CSCF 240 may determine that the IMS service timer has not expired, and I-CSCF 240 may cause registration trigger information, associated with the IMS service, to be provided to terminating device 210.

Registration trigger information may include information that, when received by terminating device 210, causes terminating device 210 to register to an IMS network. In some implementations, I-CSCF 240 may include a registration trigger function that generates and provides the registration trigger information. Additionally, or alternatively, the registration trigger function may be included in another device and/or a separate device, and I-CSCF 240 may cause the other device and/or the separate device to provide the registration trigger information to terminating device 210. In some implementations, the registration trigger information may be in the form of an SMS message. Additionally, or alternatively, the registration trigger information may be in another form.

In some implementations, I-CSCF 240 may cause the registration trigger information to be provided to terminating device 210, and I-CSCF 240 may wait to receive an indication that terminating device 210 has registered to the IMS network, as shown by block 690. In some implementations, I-CSCF 240 may wait to receive the indication for a period of time (e.g., 0.5 seconds, 1 second, etc.) before returning to block 620 and repeating the attempt to cause terminating device 210 to register to the IMS network. In this way, I-CSCF 240 may allow time for terminating device 210 to register with the IMS network after receiving the registration trigger information while avoiding the creation of an unnecessary amount of location requests. This process may be repeated until I-CSCF 240 receives an indication that terminating device 210 has registered to the IMS network or until the IMS service timer expires, as described above. In some implementations, I-CSCF 240 may receive the indication that terminating device 210 has registered to the IMS network, and I-CSCF 240 may provide the service information to a particular S-CSCF 245 that is to serve terminating device 210 (e.g., to cause the IMS service may be provided to terminating device 210).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
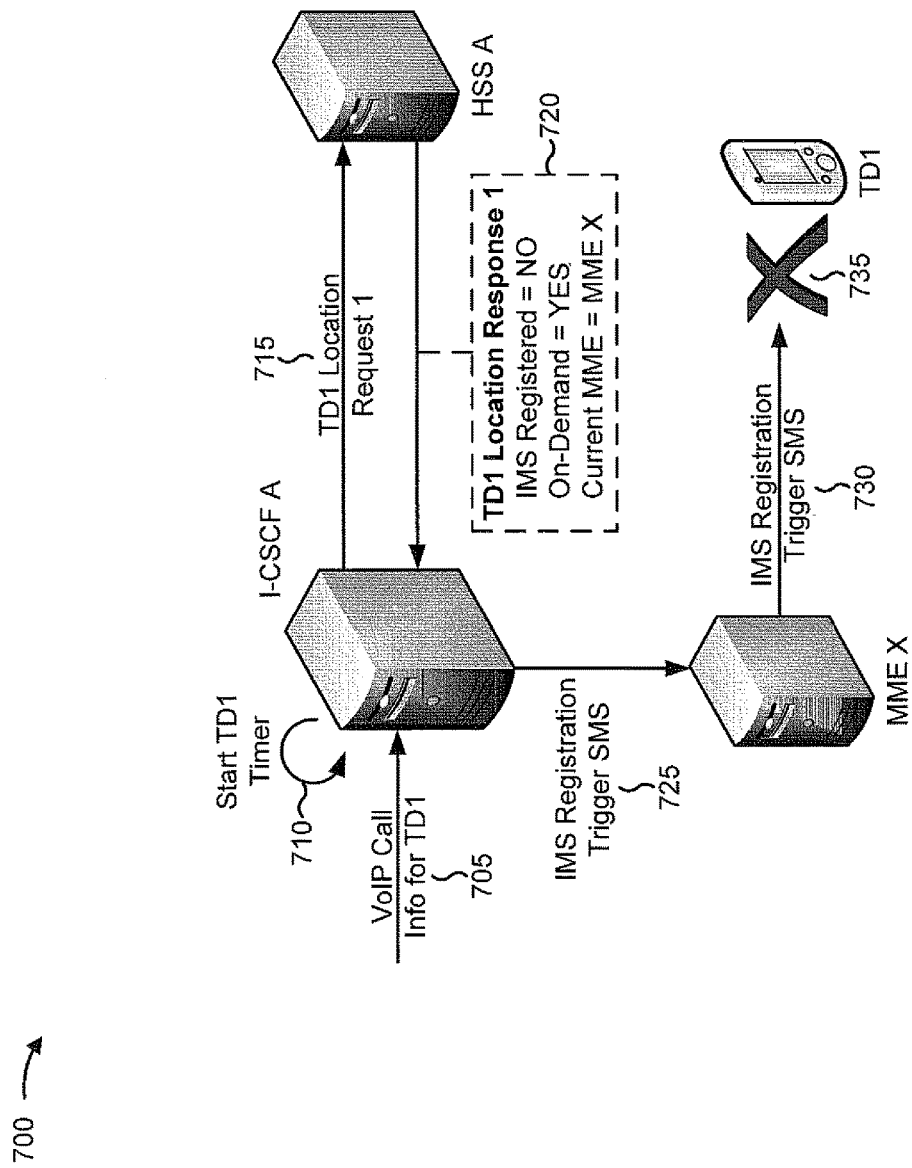
FIGS. 7A and 7B are diagrams of an example implementation relating to the example process shown in FIG. 6.
Figure 7B:
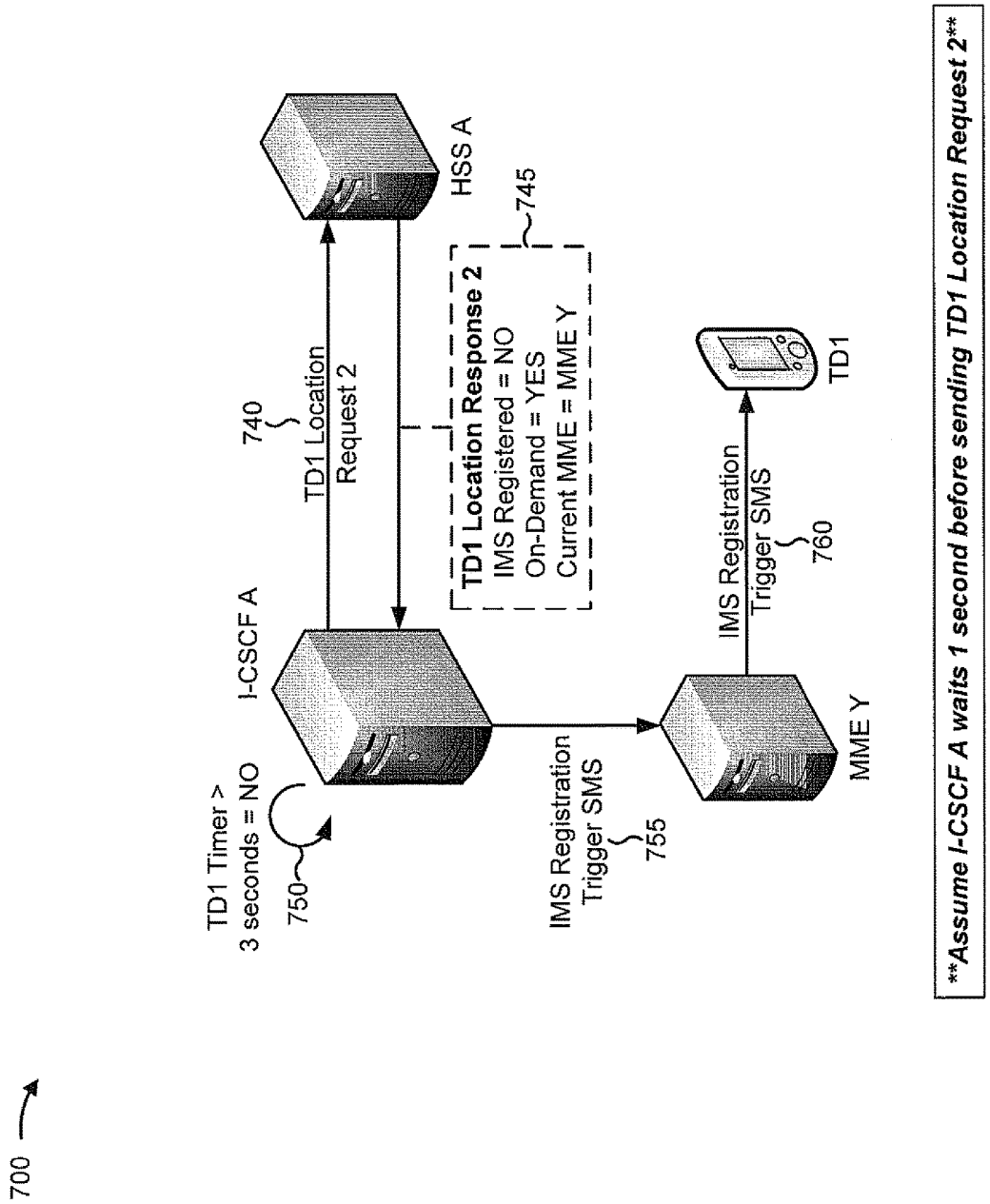

FIGS. 7A and 7B are diagrams of an example implementation 700 relating to example process 600 shown in FIG. 6.

For the purposes of example implementation 700, assume that an originating device, OD1, has provided service information associated with initiating a VoIP call between OD1 and a terminating device, TD1. Further, assume that OD1 has provided the service information to a first S-CSCF (e.g., S-CSCF 1) and that S-CSCF 1 is configured to provide the service information to an I-CSCF (e.g., I-CSCF A) that serves TD1.

As shown in FIG. 7A, and by reference number 705, I-CSCF A may receive the service information (e.g., VoIP call information for TD1). As shown by reference number 710, I-CSCF A may start an IMS service timer associated with causing TD1 to register to the IMS network. For the purposes of example implementation 700, assume that the IMS service timer is configured to expire after a period of three seconds.

As shown by reference number 715, I-CSCF A may send a first location request (e.g., TD1 Location Request 1), associated with TD1, to HSS A associated with the IMS network. As shown by reference number 720, HSS A may provide a response to the first location request (e.g., TD1 Location Response 1) that includes information indicating that TD1 is not registered to the IMS network (e.g., IMS Registered=NO), information indicating that TD1 is an IMS on-demand device (e.g., On-Demand=YES), and information identifying an MME to which TD1 is connected (e.g., Current MME=MME X). As shown by reference number 725, I-CSCF A may provide an IMS registration trigger SMS to MME X (e.g., since TD1 is not registered to the IMS network and is an IMS on-demand device). As shown by reference number 730, MME X may attempt to forward the registration trigger information to TD1. However, as shown by reference number 735, TD1 may not receive the registration trigger information SMS (e.g., assume that TD1 is in temporarily out of LTE coverage and/or that TD1 is in the process of connecting to a different MME).

As shown in FIG. 7B, assume that I-CSCF A waits one second to allow TD1 to register with the IMS network. As shown by reference number 740, I-CSCF A may send a second location request (e.g., TD1 Location Request 2), associated with TD1, to HSS A, after waiting for one second. As shown by reference number 745, HSS A may provide a response to the second location request (e.g., TD1 Location Response 2) that includes information indicating that TD1 is not registered to the IMS network (e.g., IMS Registered=NO), information indicating that TD1 is an IMS on-demand device (e.g., On-Demand=YES), and information identifying an MME to which TD1 is connected (e.g., Current MME=MME Y) (e.g., assume that TD1 has connected to a different MME). As shown by reference number 750, I-CSCF A may determine that the IMS service time has not expired (e.g., three seconds have not elapsed since I-CSCF A initially received the service information). As shown by reference number 755, I-CSCF A may provide another IMS registration trigger SMS to MME Y. As shown by reference number 760, MME Y may forward the registration trigger information to TD1.

In some implementations, TD1 may register to the IMS network (e.g., in the manner described below), and I-CSCF A may receive an indication that TD1 has been assigned to a particular S-CSCF in a response to another location request (e.g., TD1 Location Response 3). I-CSCF A may then forward the service information to the particular S-CSCF (e.g., to cause the IMS service to be provided to TD1).

As indicated above, FIGS. 7A and 7B are provided merely as an example. Other examples are possible and may differ from what was described with regard to FIGS. 7A and 7B.

Figure 8:
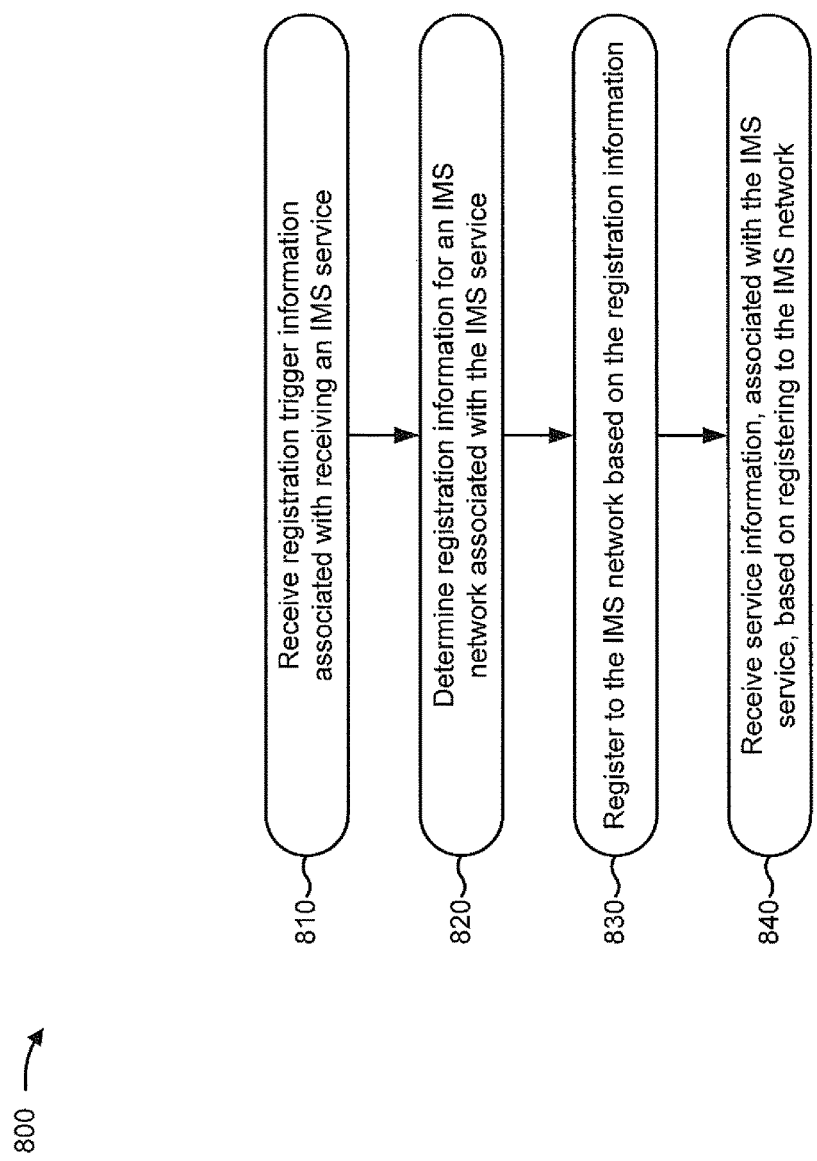
FIG. 8 is a flow chart of an example process for receiving registration trigger information, associated with receiving an IMS service, and registering to an IMS network to receive the IMS service.

FIG. 8 is a flow chart of an example process 800 for receiving registration trigger information, associated with receiving an IMS service, and registering to an IMS network to receive the IMS service. In some implementations, one or more process blocks of FIG. 8 may be performed by terminating device 210. In some implementations, one or more process blocks of FIG. 8 may be performed by another device or a group of devices separate from or including terminating device 210, such as another device included in environment 200.

As shown in FIG. 8, process 800 may include receiving registration trigger information associated with receiving an IMS service (block 810). For example, terminating device 210 may receive registration trigger information associated with receiving an IMS service. In some implementations, terminating device 210 may receive the registration trigger information after I-CSCF 240 provides the registration trigger information. Additionally, or alternatively, terminating device 210 may receive the registration trigger information after the registration trigger information is provided by another device, such as MME 220.

Registration trigger information may include information that, when received by terminating device 210, causes terminating device 210 to register to an IMS network, as described above. In some implementations, terminating device 210 may receive the registration trigger information from MME 220 through which terminating device 210 is connected to the EPC network.

As further shown in FIG. 8, process 800 may include determining registration information for an IMS network associated with the IMS service (block 820). For example, terminating device 210 may determine registration information for an IMS network associated with the IMS service. In some implementations, terminating device 210 may determine the registration trigger information after terminating device 210 receives the registration trigger information.

As described above, registration information may include information that permits a device (e.g., originating device 205, terminating device 210) to register to an IMS network in order to initiate and/or receive an IMS service via the IMS network. Terminating device 210 may determine the registration information in a manner similar to that describe above with regard originating device 210.

As further shown in FIG. 8, process 800 may include registering to the IMS network based on the registration information (block 830). For example, terminating device 210 may register to the IMS network based on the registration information. In some implementations, terminating device 210 may register to the IMS network after terminating device 210 determines the registration information.

In some implementations, terminating device 210 may register to the IMS network based on the registration information in a manner similar to that described above with regard to originating device 205. In this way, terminating device 210 may register to the IMS network and may communicate via P-CSCF 235 and S-CSCF 245 to receive an IMS service.

In some implementations, terminating device 210 may register to the IMS network, and I-CSCF 240 may be notified that terminating device 210 has registered to the IMS network (e.g., such that I-CSCF 240 may cease causing IMS registration trigger information to be provided to terminating device 210).

As further shown in FIG. 8, process 800 may include receiving service information, associated with the IMS service, based on registering to the IMS network (block 840). For example, terminating device 210 may receive service information, associated with the IMS service, based on registering to the IMS network. In some implementations, terminating device 210 may receive the service information after terminating device 210 registers to the IMS network. Additionally, or alternatively, terminating device 210 may receive the service information when the service information is provided by another device, such as I-CSCF 240 and/or S-CSCF 245.

Service information, associated with an IMS service, may include information associated with initiating and/or receiving an IMS service, as described above. In some implementations, terminating device 210 may receive the service information and the IMS service may be provided to terminating device 210. For example, terminating device 210 may receive the service information (e.g., associated with a VoIP call) and the VoIP call between originating device 205 and terminating device 210 may be established.

In some implementations, terminating device 210 may deregister from the IMS network after the IMS service has ended. For example, terminating device 210 may register to the IMS network to receive a VoIP call from originating device 205. In this example, terminating device 210 may deregister from the IMS network after the VoIP call ends (e.g., when the VoIP call is disconnected). Additionally, or alternatively, terminating device 210 may deregister from the IMS network after a threshold amount of time, as described above with regard to originating device 205. Additionally, or alternatively, originating device 205 may deregister based on a command provided by another device, as described above with regard to originating device 205.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
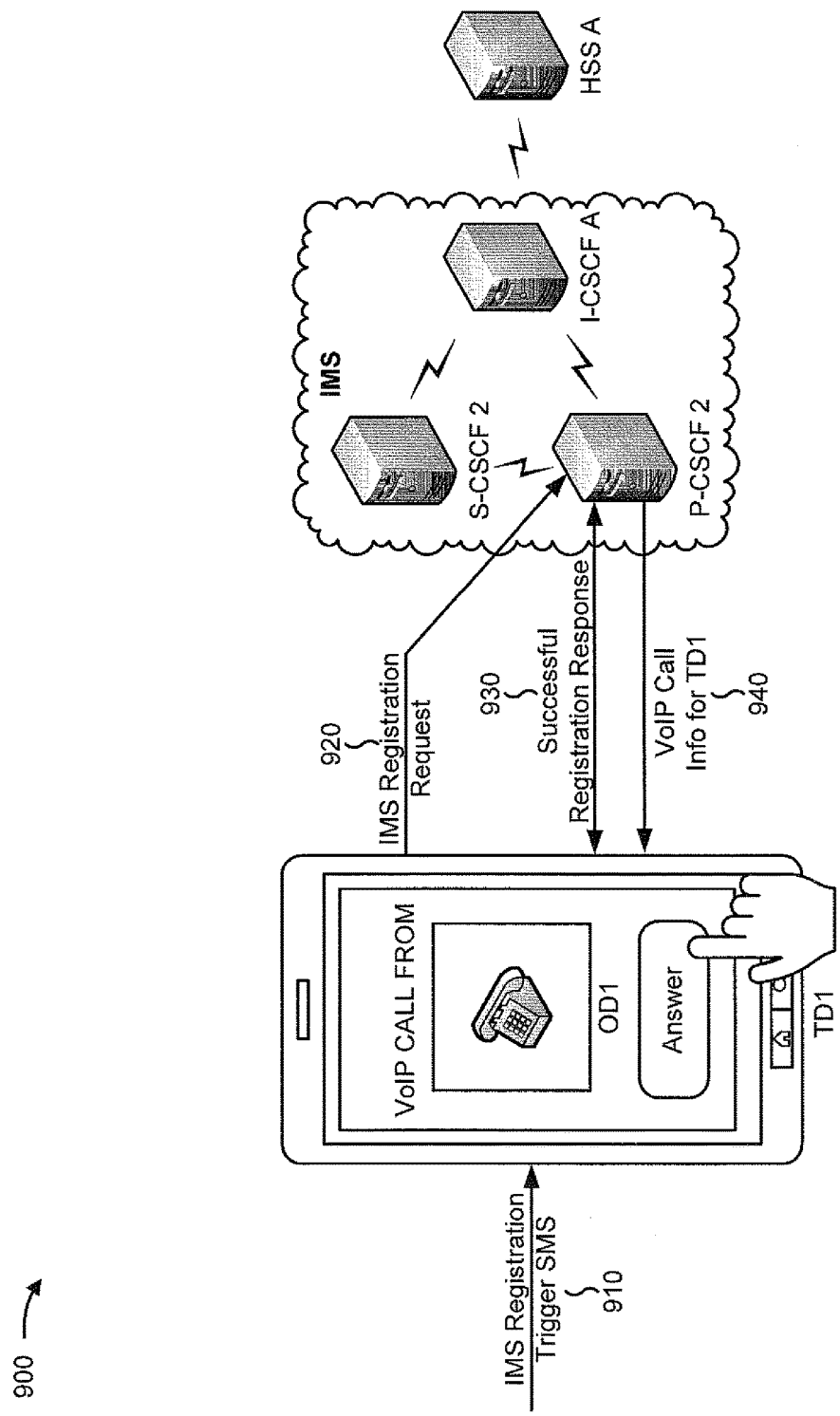
FIG. 9 is a diagram of an example implementation relating to the example process shown in FIG. 8.

FIG. 9 is a diagram of an example implementation 900 relating to example process 800 shown in FIG. 8. For the purposes of example implementation 900, assume that a user of an originating device, OD1, wishes to initiate a VoIP call to a terminating device, TD1, using a VoIP service, and that an I-CSCF device (e.g., I-CSCF A) has caused an IMS registration trigger SMS to be provided to TD1. Also, assume that OD1 has provided, via an IMS network, service information associated with initiating the VoIP call. Further assume that TD1 is not registered to the IMS network, and that TD1 is configured to register to the IMS network based on receiving the IMS registration trigger SMS. Finally, assume that TD1 is connected to an EPC network, and that TD1 stores information that identifies a P-CSCF device (e.g., P-CSCF 2) through which TD1 is to register to the IMS network.

As shown in FIG. 9, and by reference number 910, TD1 may receive (e.g., via the EPC network) the IMS registration trigger SMS. As shown by reference number 920, TD1 may send, to P-CSCF 2, a registration request associated with registering to the IMS service (e.g., based on receiving the IMS registration trigger SMS). As shown by reference number 930, TD1 may register to the IMS network. For example, P-CSCF 2 may identify I-CSCF A that is to serve TD1, and may provide the registration request to I-CSCF A. I-CSCF A may communicate with HSS A, associated with the IMS network, to determine that S-CSCF 2 is to serve TD1, and may forward the registration request to S-CSCF 2. S-CSCF 2 may communicate with HSS A to determine authentication information associated with TD1, and may communicate with TD1 to register TD1 to the IMS network. In this way, TD1 may register to the IMS network and may communicate via P-CSCF 2 and S-CSCF 2 to receive the VoIP call from OD1. As shown by reference number 940, TD1 may receive, from S-CSCF 2, service information (e.g., VoIP call information) associated with the VoIP call from OD1 (e.g., such that VoIP call may be connected). In some implementations, I-CSCF A that serves the registration procedure of TD1 and the I-CSCF A that initiates IMS registration trigger to TD1 may be the same or different I-CSCF 240, since IMS registration and IMS service termination are independent.

As indicated above, FIG. 9 is provided merely as an example. Other examples are possible and may differ from what was described with regard to FIG. 9.

Implementations described herein may allow a user device (e.g., an originating device, a terminating device) to register to an IMS network only when the user device is initiating or receiving an IMS service via the IMS network (e.g., rather than automatically registering to the IMS network on a periodic basis).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information.

Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory to store instructions; and
    one or more processors to execute the instructions in the memory to:
        receive service information,
            the service information being associated with an internet protocol multimedia subsystem (IMS) service,
            the IMS service being provided via an IMS network, and
            the service information including information that identifies a terminating device that is to receive the IMS service;
        determine that the terminating device is not registered to the IMS network;
        determine whether the terminating device is configured to register to the IMS network based on determining that the terminating device is not registered to the IMS network and based on a response to a location request previously provided by the device,
            the location request including a request for information associated with provisioning the IMS service to the terminating device, and
            the location request including a request for an address of a serving call session control function (S-CSCF) device associated with the terminating device;
        cause registration trigger information to be provided to the terminating device when the terminating device is determined to be configured to register to the IMS network,
            the registration trigger information being provided to the terminating device to cause the terminating device to register to the IMS network and to allow the terminating device to receive the IMS service via the IMS network; and
        prevent the registration trigger information from being provided to the terminating device when the terminating device is determined to not be configured to register to the IMS network.

2. The device of claim 1, where the one or more processors are further to:
    determine location information associated with the terminating device; and
    where the one or more processors, when causing the registration trigger information to be provided to the terminating device, are to:
        cause the registration trigger information to be provided to the terminating device based on the location information associated with the terminating device.

3. The device of claim 2, where the location information includes:
    location information that identifies a management device associated with the terminating device; and
    where the one or more processors, when causing the registration trigger information to be provided to the terminating device, are to:
        cause the registration trigger information to be provided to the terminating device by providing the registration trigger information to the management device.

4. The device of claim 1, where the one or more processors are further to:
    determine that the terminating device is an IMS on-demand device; and
    where the one or more processors, when causing the registration trigger information to be provided to the terminating device, are to:
        cause the registration trigger information to be provided to the terminating device based on determining that the terminating device is an IMS on-demand device.

5. The device of claim 1, where the registration trigger information includes a first registration trigger; and
    where the one or more processors are further to:
        wait, for a period of time, to receive an indication that the terminating device has registered to the IMS network;
        receive no indication that the terminating device has registered to the IMS network during the period of time; and
        cause a second registration trigger to be provided to the terminating device based on receiving no indication that the terminating device has registered to the IMS network during the period of time.

6. The device of claim 1, where the one or more processors are further to:
    determine that an IMS service timer, associated with the terminating device, has expired; and
    cease causing the registration trigger information to be provided to the terminating device based on the IMS service timer expiring.

7. The device of claim 1, where the one or more processors are further to:

determine that the IMS service has ended; and
cause the terminating device to deregister from the IMS network based on determining that the IMS service has ended.

8. A computer-readable medium storing instructions, the instructions comprising:
one or more instructions that, when executed by one or more processors of a device, cause the one or more processors to:
receive service information associated with an internet protocol multimedia subsystem (IMS) service,
the service information identifying a terminating device that is to receive the IMS service, and
the IMS service being associated with an IMS network;
determine that the terminating device is not registered to the IMS network;
determine whether the terminating device is configured to register to the IMS network based on determining that the terminating device is not registered to the IMS network and based on a response to a location request previously provided by the device,
the location request including a request for information associated with provisioning the IMS service to the terminating device,
the location request including a request for an address of a serving call session control function (S-CSCF) device associated with the terminating device;
cause registration trigger information to be sent to the terminating device when the terminating device is determined to be configured to register to the IMS network,
the registration trigger information being provided to the terminating device to cause the terminating device to register to the IMS network to permit the terminating device to receive the IMS service via the IMS network; and
prevent the registration trigger information from being provided to the terminating device when the terminating device is determined to not be configured to register to the IMS network.

9. The computer-readable medium of claim 8, where the one or more instructions, when executed by the one or more processors, further cause the one or more processors to:
determine location information associated with the terminating device; and
where the one or more instructions, that cause the one or more processors to cause the registration trigger information to be sent to the terminating device, cause the one or more processors to:
cause the registration trigger information to be provided to the terminating device based on the location information associated with the terminating device.

10. The computer-readable medium of claim 9, where the location information includes:
location information that identifies a management device associated with the terminating device; and
where the one or more instructions, that cause the one or more processors to cause the registration trigger information to be sent to the terminating device, cause the one or more processors to:
cause the registration trigger information to be sent to the terminating device by sending the registration trigger information to the management device.

11. The computer-readable medium of claim 8, where the one or more instructions, when executed by the one or more processors, further cause the one or more processors to:
determine that the terminating device is an IMS on-demand device; and
where the one or more instructions, that cause the one or more processors to cause the registration trigger information to be sent to the terminating device, cause the one or more processors to:
cause the registration trigger information to be sent to the terminating device based determining that the terminating device is an IMS on-demand device.

12. The computer-readable medium of claim 8, where the registration trigger information includes a first registration trigger; and
where the one or more instructions further cause the one or more processors to:
wait, for a period of time, to receive an indication that the terminating device has registered to the IMS network;
receive no indication that the terminating device has registered to the IMS network during the period of time; and
cause a second registration trigger to be sent to the terminating device based on receiving no indication that the terminating device has registered to the IMS network during the period of time.

13. The computer-readable medium of claim 8, where the one or more instructions, when executed by the one or more processors, further cause the one or more processors to:
determine that an IMS service timer, associated with the terminating device, has expired; and
cease causing the registration trigger information to be sent to the terminating device based on the IMS service timer expiring.

14. The computer-readable medium of claim 8, where the one or more instructions, when executed by the one or more processors, further cause the one or more processors to:
determine that the IMS service has ended; and
cause the terminating device to deregister from the IMS network based on determining that the IMS service has ended.

15. A method, comprising:
receiving, by a device, internet protocol multimedia subsystem (IMS) service information,
the IMS service information being associated with an IMS service,
the IMS service being provided via an IMS network, and
the IMS service information including information that identifies a terminating device that is to receive the IMS service;
determining, by the device, location information associated with the terminating device,
the location information indicating that the terminating device is not registered to the IMS network;
determining, by the device, whether the terminating device is configured to register to the IMS network based on the location information indicating that the terminating device is not registered to the IMS network and based on a response to a location request previously provided by the device,
the location request including a request for information associated with provisioning the IMS service to the terminating device, and the location request including a request for an address of a serving call session control function (S-CSCF) device associated with the terminating device;

providing, by the device, registration trigger information to the terminating device when the terminating device is determined to be configured to register to the IMS network, the registration trigger information being provided to the terminating device to cause the terminating device to register to the IMS network, and the terminating device registering to the IMS network to cause the terminating device to receive the IMS service; and preventing, by the device, the registration trigger information from being provided to the terminating device when the terminating device is determined to not be configured to register to the IMS network.

16. The method of claim 15, further comprising:
sending a request associated with the location information;
receiving a response to the request; and
where determining the location information associated with the terminating device comprises:
determining the location information based on the response to the request.

17. The method of claim 15, further comprising:
determining that an IMS service timer, associated with the terminating device, has expired; and
preventing the registration trigger information from being provided to the terminating device based on determining that the IMS service timer has expired.

18. The method of claim 15, further comprising:
determining that the terminating device is an IMS on-demand device; and
where providing the registration trigger information to the terminating device comprises:
providing the registration trigger information to the terminating device based on determining that the terminating device is an IMS on-demand device.

19. The method of claim 15, where the location information is first location information and the registration trigger information includes a first registration trigger; and
where the method further comprises:
waiting, for a period of time, to receive an indication that the terminating device has registered to the IMS network after providing the registration trigger information to the terminating device;
receiving no indication that the terminating device has registered to the IMS network during the period of time;
determining second location information associated with the terminating device based on receiving no indication that the terminating device has registered to the IMS network; and
providing a second registration trigger to the terminating device based on the second location information.

20. The method of claim 15, further comprising:
determining that the IMS service has ended; and
causing the terminating device to deregister from the IMS network based on determining that the IMS service has ended.

* * * * *